(12) United States Patent
Zou et al.

(10) Patent No.: US 10,412,083 B2
(45) Date of Patent: *Sep. 10, 2019

(54) DYNAMICALLY GENERATED SSID

(71) Applicant: SonicWALL US Holdings Inc., Santa Clara, CA (US)

(72) Inventors: Guo Hui Zou, Shanghai (CN); Zhong Chen, San Jose, CA (US); Zhuangzhi Duo, Fremont, CA (US); Xiaodong Lin, Shanghai (CN)

(73) Assignee: SONICWALL INC., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,758

(22) Filed: Dec. 12, 2017

(65) Prior Publication Data

US 2018/0167389 A1 Jun. 14, 2018

Related U.S. Application Data

(63) Continuation of application No. 14/603,208, filed on Jan. 22, 2015, now Pat. No. 9,843,579.

(51) Int. Cl.

| | |
|---|---|
| *H04L 29/06* | (2006.01) |
| *H04W 12/08* | (2009.01) |
| *H04W 48/12* | (2009.01) |
| *H04W 12/04* | (2009.01) |
| *H04W 76/11* | (2018.01) |
| *H04W 12/06* | (2009.01) |
| *H04W 88/08* | (2009.01) |
| *H04W 24/02* | (2009.01) |

(52) U.S. Cl.
CPC ...... *H04L 63/0869* (2013.01); *H04L 63/0876* (2013.01); *H04W 12/04* (2013.01); *H04W 12/08* (2013.01); *H04W 48/12* (2013.01); *H04W 76/11* (2018.02); *H04W 12/06* (2013.01); *H04W 24/02* (2013.01); *H04W 88/08* (2013.01)

(58) Field of Classification Search
CPC ............ H04L 63/0869; H04L 63/0421; H04L 12/4625; H04W 76/021; H04W 88/08; H04W 12/06; H04W 12/08
USPC .......................................................... 726/6
See application file for complete search history.

(56) References Cited

U.S. PATENT DOCUMENTS

| | | |
|---|---|---|
| 8,032,117 B2 | 10/2011 | Ross et al. |
| 9,843,579 B2 | 12/2017 | Zou |
| 2005/0195781 A1 | 9/2005 | Ikeda |
| 2007/0159997 A1 | 7/2007 | Tsai et al. |

(Continued)

OTHER PUBLICATIONS

U.S. Appl. No. 14/603,208 Final Office Action dated Feb. 13, 2017.
U.S. Appl. No. 14/603,208 Office Action dated Aug. 25, 2016.

*Primary Examiner* — Tu T Nguyen
(74) *Attorney, Agent, or Firm* — Polsinelli LLP

(57) ABSTRACT

A plurality of beacons that do not include any service set identifiers may be broadcast from an access point. A request concerning association with the access point may be sent wirelessly from a user device and received at the access point. A unique service set identifier (SSID) for the requesting user device may be generated, and information regarding the unique SSID may be transmitted to the requesting user device. A subsequent association request from the requesting user device may include the unique SSID.

30 Claims, 4 Drawing Sheets

(56) References Cited

U.S. PATENT DOCUMENTS

2011/0302411 A1* 12/2011 Liang ................. H04L 63/0823
　　　　　　　　　　　　　　　　　　　713/158
2014/0337633 A1　11/2014 Yang et al.

* cited by examiner

DYNAMICALLY GENERATED SSID

CROSS-REFERENCE TO RELATED APPLICATIONS

This application is a continuation and claims the priority benefit of U.S. patent application Ser. No. 14/603,208 filed Jan. 22, 2015, now U.S. Pat. No. 9,843,579, the disclosure of which is incorporated herein by reference.

BACKGROUND

1. Field of the Invention

The present invention generally relates to service set identifiers (SSIDs). More specifically, the present invention relates to dynamically generated SSIDs.

2. Description of the Related Art

Presently available computer networking systems may use wireless standards promulgated by such standards-setting organizations as the Institute of Electrical and Electronics Engineers (IEEE). Such standards may include various specifications and protocols (e.g., 802.11) for implementing wireless communications among computing devices.

An exemplary wireless communication network may include one or more access points (including wired and wireless access points) and wireless communication devices. Each access point may be identified by a service set identifier (SSID), which may serve as a unique name for the wireless communication network served by the access point. Such SSID may be broadcast throughout the coverage area of the respective access point. As such, a user device that is capable of wireless communication and located within a coverage area of the access point may detect such broadcasts and request to the join its associated wireless communication network.

Because the SSID does not change in presently available computer networking system, the wireless communication network may be vulnerable to scanning and attack by malicious parties. For example, an attacker may set up another access point that spoofs the same SSID, which may then be broadcast within the same coverage area, but with increased transmit power. As such, user devices attempting to connect to the wireless communication network may be fooled into connecting to the attacker access point.

In addition, an attacker may perpetrate a distributed denial of service (DDOS) attack by spoofing management frames, including packets that include a deauthentication request. Such a spoofed deauthentication request may result in an access point mistakenly deauthenticating devices currently connected to or otherwise associated with that access point. In that regard, service to such devices may be disrupted, as the access point would have terminated the association over which service would have been provided.

One way the problem has been addressed in the past has been by hiding the SSID and preventing the SSID from being broadcast. Such a technique may also be referred to as network cloaking. As such, the wireless device must have previously obtained the SSID and specifically submit a request with that SSID in order to join the wireless communication network. While hiding the SSID may present an obstacle to attackers, such a tactic is not effective against a determined attack, attackers with packet sniffing capabilities, or where the SSID may be known to devices that may themselves be vulnerable to attack.

There is, therefore, a need in the art for improved systems and methods for securing wireless communication networks that use SSIDs.

SUMMARY OF THE CLAIMED INVENTION

Embodiments of the present invention include systems and methods for providing dynamically generated SSIDs. A plurality of beacons that do not include any SSIDs may be broadcast from an access point. A request concerning association with the access point may be sent wirelessly from a user device and received at the access point. A unique service set identifier (SSID) for the requesting user device may be generated, and information regarding the unique SSID may be transmitted to the requesting user device. A subsequent association request from the requesting user device may include the unique SSID.

Additional embodiments of the present invention may include methods for providing dynamically generated SSIDs. Such methods for dynamically generating service set identifiers may include broadcasting a plurality of beacons that do not include any service set identifiers from an access point, receiving an authentication request sent wirelessly from a user device concerning association with the access point, executing instructions to generate a unique service set identifier (SSID) to the requesting user device, and transmitting information regarding the unique SSID to the requesting user device, wherein a subsequent association request from the requesting user device includes the unique SSID.

Further embodiments of the present invention may include apparatuses for dynamically generating service set identifiers. Such apparatuses for dynamically generating service set identifiers may include an antenna that broadcasts a plurality of beacons from an access point, wherein the beacons do not include any service set identifiers and that receives a request sent wirelessly from a user device, the request concerning association with the access point. The apparatuses may further include a processor that executes instructions stored in memory, wherein execution of the instructions by the processor generates a unique service set identifier (SSID) for the requesting user device. The antenna may further transmit information regarding the unique SSID to the requesting user device, wherein a subsequent association request from the requesting user device includes the unique SSID.

Various embodiments of the present invention may further include non-transitory computer-readable storage media, having embodied thereon a program executable by a processor to perform methods for providing dynamically generated SSIDs as described herein.

DETAILED DESCRIPTION

Embodiments of the present invention allow for systems and methods of providing dynamically generated SSIDs. A plurality of beacons that do not include any SSIDs may be broadcast from an access point. A request concerning association with the access point may be sent wirelessly from a user device and received at the access point. A unique service set identifier (SSID) for the requesting user device may be generated, and information regarding the unique SSID may be transmitted to the requesting user device. A subsequent association request from the requesting user device may include the unique SSID.

Figure 1:
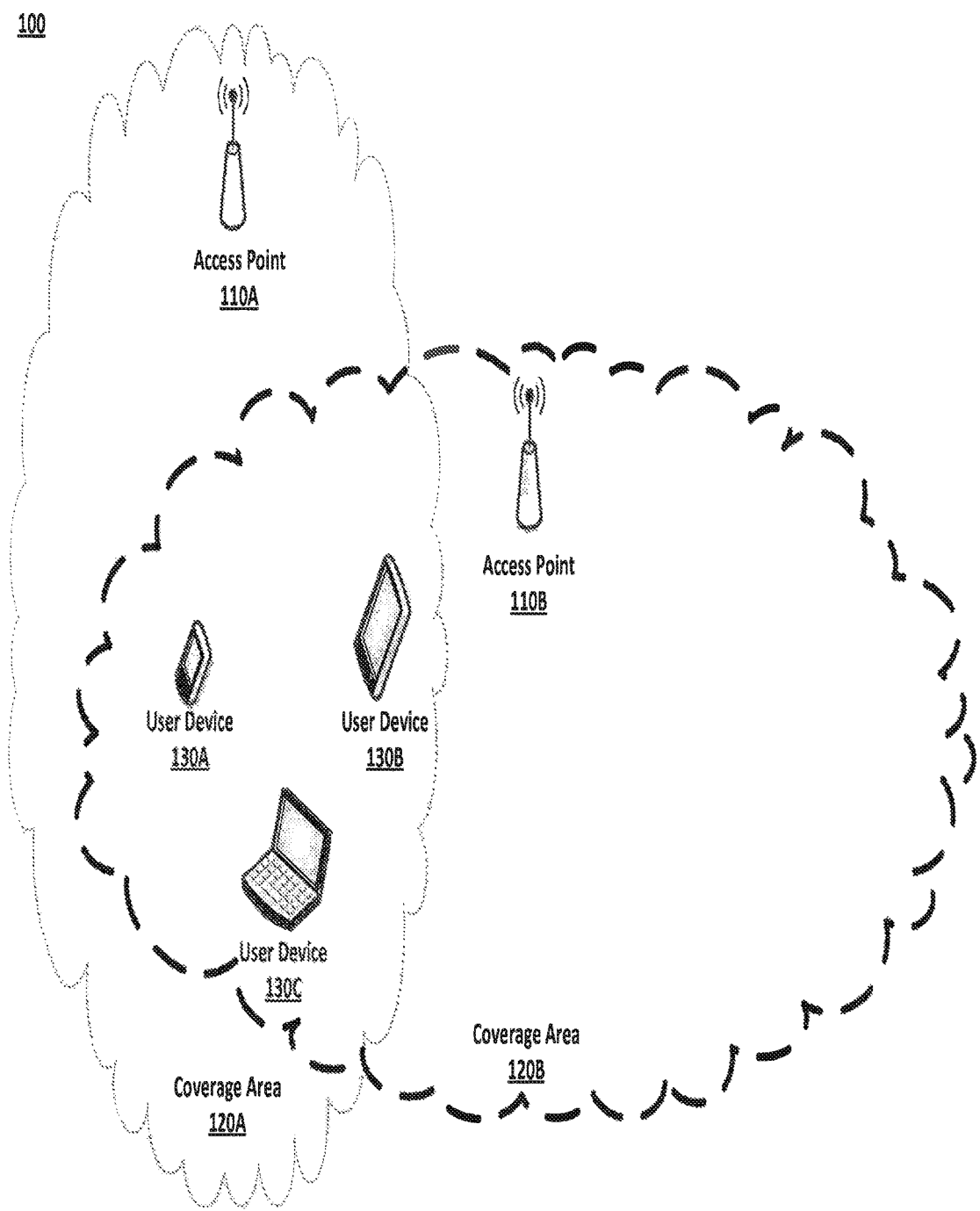
FIG. 1 illustrates a network environment in which an exemplary system for providing dynamically generated SSIDs may be implemented.

FIG. 1 illustrates a network environment 100 in which an exemplary system for providing dynamically generated SSIDs may be implemented. Network environment 100 may include one or more access points 110A-B each with a corresponding coverage area 120A-B, and one or more user devices 130A-C. As illustrated, the user devices 130A-C may all be within the respective coverage areas of access point 110A (e.g., coverage area 120A) and access point 110B (e.g., coverage area 120B).

Access point 110A-B may be associated with or part of a router and may generally include one or more antennas, radios, and batteries or other power source. In that regard, access points 110A-B may be any device known in the art for allowing wireless user devices to connect to a wired network via a wireless communication network. Such a wireless communication network may be a local, proprietary network (e.g., an intranet) and/or may be a part of a larger wide-area network. The communications network may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider.

Coverage areas 120A-B are each associated with a respective access point 110A-B and represent the geographic area services by the respective access point 110A-B. The characteristics of a coverage area 110A (e.g., size, shape) may depend on the associated access point 110A and its antenna configuration, power, and other components.

Users may use any number of different electronic user devices 130A-C, such as general purpose computers, mobile phones, smartphones, personal digital assistants (PDAs), portable computing devices (e.g., laptop, netbook, tablets), desktop computing devices, handheld computing device, or any other type of computing device capable of communicating over a wireless communication network. User devices 130A-C may also be configured to access data from other storage media, such as memory cards or disk drives as may be appropriate in the case of downloaded services. User device 130A-C may include standard hardware computing components such as network and media interfaces, non-transitory computer-readable storage (memory), and processors for executing instructions that may be stored in memory.

In the prior art, access point 110A would broadcast its SSID throughout coverage area 120A, thereby allowing user devices 130A-C to discover and associate with access point 110A. Such a prior art system would be vulnerable, however, if an attacker were to scan for the SSID of access point 110A. Such attacker may then be able to set up another access point 110B that spoofs the SSID in beacons broadcast increased transmit power throughout its respective coverage area 120B. User devices 130A-C may thereafter try to associate with access point 110B, thereby breaking the association with access point 110A. Likewise, deauthentication requests with spoofed SSIDs may be result in broken links between the servicing access point 110A and the serviced user devices 130A-C.

In embodiments of the present invention, however, no SSID would be included in beacons sent from access point 110A throughout its respective coverage area 120A. Rather, the user device 130A may respond to the beacon by sending an authentication request to access point 110A, which may then dynamically generate a unique SSID for the user device 130A. In that regard, another user device 130B providing different information to the access point 110A would also receive a dynamically generated SSID that is different, as well as unique to the other user device 130B.

Figure 2:
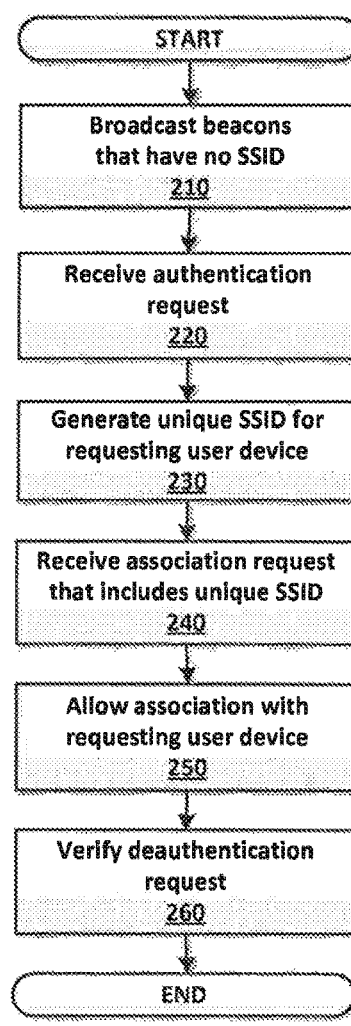
FIG. 2 is a flowchart illustrating an exemplary method for providing dynamically generated SSIDs.

FIG. 2 illustrates a method 200 for providing dynamically generated SSIDs. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, a plurality of beacons that do not include any service set identifiers may be broadcast from an access point. An authentication request concerning association with the access point may be sent wirelessly from a user device and received at the access point. A unique service set identifier (SSID) for the requesting user device may be generated, and information regarding the unique SSID may be transmitted to the requesting user device. A subsequent association request from the requesting user device may include the unique SSID. During the time period when the requesting user device is associated with the access point, any deauthentication requests would be verified prior to disassociation.

In step 210, access point 110A may broadcast beacons that have no SSID. Like prior art beacons, such beacons may advertise the availability of the access point 110A to service user devices 130 in the coverage area. For example, such beacons may advertise a secure wireless communication network provided by access point 110A and that would allow user devices 130 to access the Internet. Other than failing to make public the SSID of access point 110A, such beacons may be in other respects similar to those broadcast by prior art access points.

In step 220, an authentication request from a user device 130A may be received by access point 110A. Such an authentication request may be sent by a user device 130A that wishes to associate with access point 110A and thereby access the secure wireless communication network provided by the same. The authentication request may include various information (e.g., MAC address) regarding the requesting user device 130A. Such an authentication request may be responsive to a probe response that may carry a flag indicating that the access point uses dynamic SSID generation in authentication.

Following receipt of the authentication request from the requesting user device 130A, the access point 110A and the requesting user device 130A may engage in mutual authentication. In step 230, a unique SSID (and session key) is generated for the requesting user device 130A. Such a unique SSID may be based on a variety of bases that may be random and/or specific to the requesting user device 130A. Such bases may include any combination of MAC address of the requesting user device 130A, random bits (e.g., numbers, characters), a pre-shared secret (e.g., between access point 110A and requesting user device 130A), and vendor-specific information. One or more bases of the SSID may be further subject to algorithms, hash functions, etc., as part of generating the SSID.

In step 240, the requesting user device 130A may send an association request containing the unique SSID to the access point 110A. Because the unique SSID associated with the requesting user device 130A is based on information that may be random or specific to that requesting user device 130A, no other devices would be able to determine or generate the same SSID (e.g., via packet sniffing). In that regard, both the access point 110A and the requesting user device 130A may use exchanged information (e.g., random or specific to requesting user device 130A) to generate the unique SSID that is to be used in associating the two devices. Because random information may be used, the same requesting user device 130A may be associated with different SSIDs in different sessions with the access point 110A. Likewise, another user device 130B that may wish to associate or that is associated with the access point 110A has its own unique SSID (e.g., based on random or specific information regarding user device 130B) that had been dynamically generated for its current session with the access point 110A.

In step 250, the access point 110A may then verify whether the SSID included in the association request matches the unique SSID generated in step 230 and associated with the requesting user device 130A. If so, the association request may be granted, and the access point 110A may begin providing service to the requesting user device 130A. In that regard, a four-way key negotiation may occur to generate a master key (e.g., based on a session key or pre-shared secret) thereby effecting the association. If the SSID in the association request is determined not to match the unique SSID associated with the requesting user device, the association request may be denied, and the requesting user device 130A is denied services from the access point 110A.

In step 260, a deauthentication request may be received indicating that the requesting user device 130A wishes to terminate communications with the access point 110A. Management frames, which include deauthentication requests, are generally unencrypted and/or unauthenticated in the prior art. In embodiments of the present invention, however, such deauthentication requests may be verified before disassociation is allowed to proceed. Such verification may take the form for a challenge sent to the requesting user device 130A. In some embodiments, such a challenge may require a response from the requesting user device 130A based on random or specific information to the requesting user device 130A.

Figure 3A:
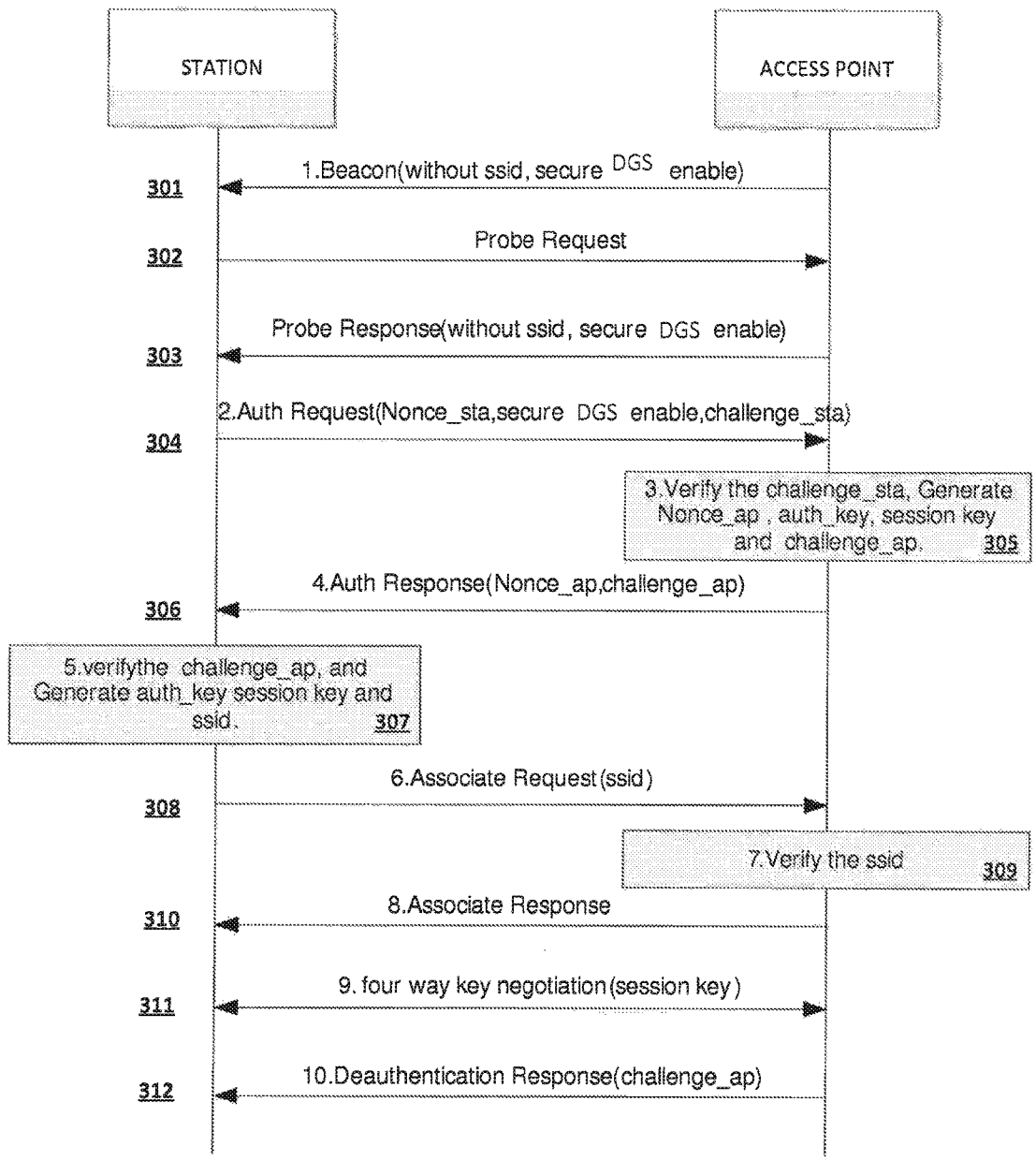
FIG. 3A is a diagram illustrating exemplary exchanges that may occur in a system for providing dynamically generated SSIDs.

FIG. 3A is a diagram illustrating exemplary exchanges that may occur in a system for providing dynamically generated SSIDs. Such exchanges may include a beacon 301 broadcast by an access point (e.g., access point 110A) and received by a wireless user device (e.g., user device 130A) or other wireless station. Such beacon 301 may advertise, for example, the presence of a secured wireless network supported by the access point. Unlike prior art beacons, however, such a beacon 301 does not advertise an SSID.

Where the station may wish to associate with the access point, the station may send a probe request 302 to the access point, which may return a probe response 303. Such probe response 303 likewise does not include an SSID. The station may follow up by sending an authentication request 304 with a pre-shared secret (and/or local nonce and challenge generated based on the pre-shared secret). The access point may then verify the challenge 305 and generate a corresponding local nonce, as well as an authentication session key and SSID. The access point may then return an authentication response 306 with the nonce and challenge.

The station may then verify the challenge 307 and generate a corresponding authentication session key and SSID. Such SSID may be generated as discussed above with respect to steps 230-240. Such SSID may be sent in an association request 308 sent to the access point, which may then verify the SSID 309 and send an association response 310. Four-way WPA key negotiation (handshake) 311 may proceed using the session key as a pairwise master key. The session may then proceed until a deauthentication request is approved. Before any deauthentication request can be approved by the access point, however, the access point may seek to verify the request 312 based on a challenge sent to the station.

Figure 3B:
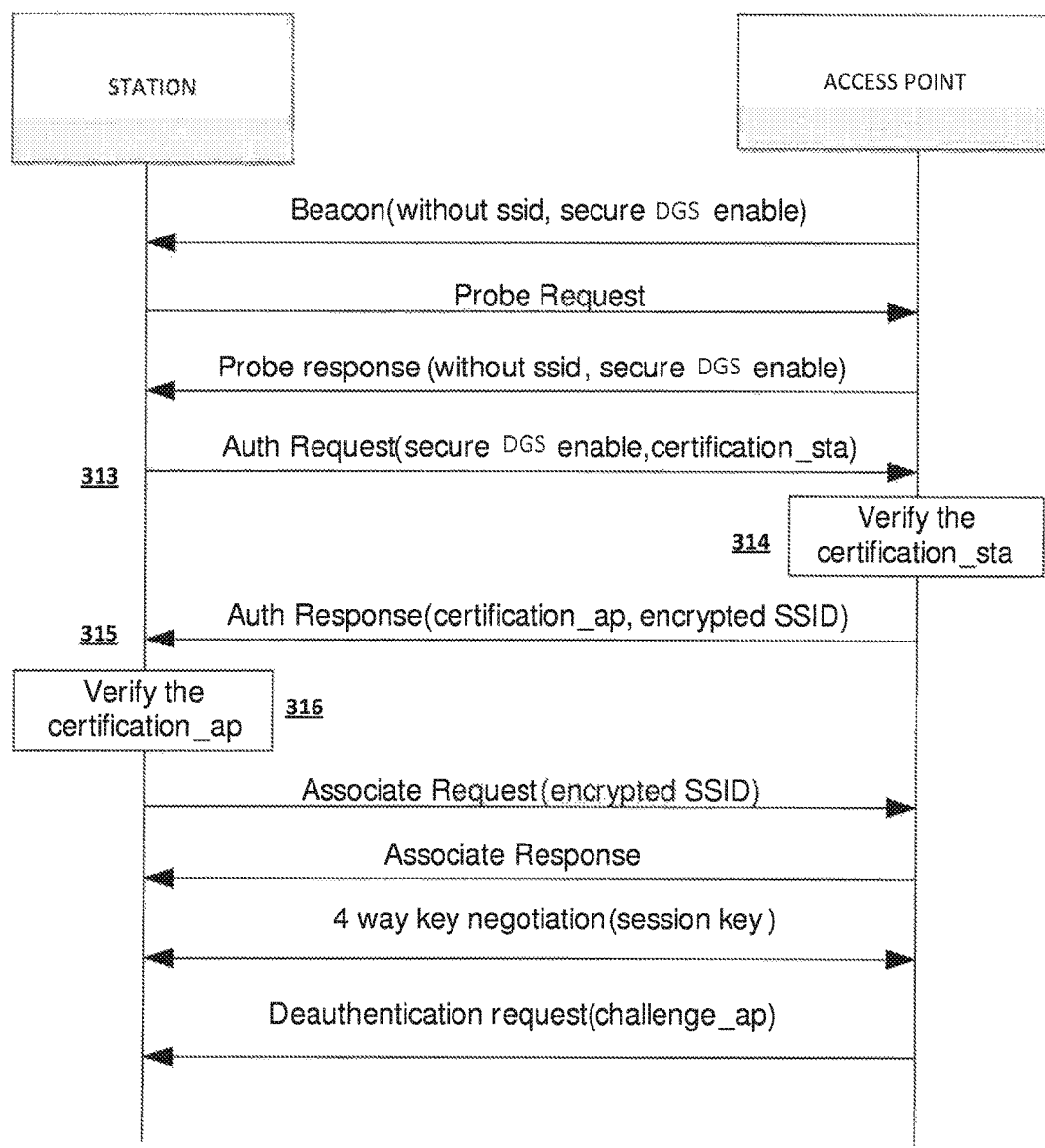
FIG. 3B is a diagram illustrating alternative exchanges that may occur in a system for providing dynamically generated SSIDs.

FIG. 3B is a diagram illustrating alternative exchanges that may occur in a system for providing dynamically generated SSIDs. Many of the steps are similar to those illustrated in FIG. 3A. The transmission of the authentication request 313 from the station to the access point, however, may include a pre-installed certification, which may contain a public key signed by a trusted authority. The access point may then verify the certification 314 and reply with an authentication response 315 with the generated SSID encrypted using the public key and pre-installed certification that includes the access point's public key signed by the same trusted authority. The station may then verify the certification 316 sent by the access point, and if successful, proceed with the remaining steps in a manner similar to those described with respect to FIG. 3A.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for securely joining a wireless network, the method comprising:
   receiving one or more beacons from an access point, wherein the one or more beacons do not include any service set identifiers (SSIDs);
   transmitting a request from a user device via a wireless network interface, the request concerning association with the access point, wherein a processor at the access point executes instructions stored in a memory at the access point to generate an SSID that is unique to the requesting user device and another user device uses a different SSID to associate with the access point, the different SSID being unique to the other user device;
   sending a subsequent association request from the requesting user device, the subsequent association request concerning association with the access point as identified by the SSID that is unique to the requesting user device, wherein the access point is associated with the requesting user device based on a verification that the subsequent association request from the requesting user device includes the SSID that is unique to the requesting user device; and
   sending a de-authentication request relating to terminating the association between the user device and the access point, wherein the association between the user device and the access point is maintained until the de-authentication request is verified.

2. The method of claim 1, wherein the SSID generated for the requesting user device is based on at least one of a MAC address of the requesting user device, random bits, a pre-shared secret, and vendor-specific information.

3. The method of claim 2, wherein generating the SSID further comprising performing a hash function on the at least one basis of the SSID.

4. The method of claim 1, wherein the requesting user device is authenticated and the requesting user device mutually authenticates the access point.

5. The method of claim 4, further comprising exchanging secret information between the requesting user device and the access point, wherein the mutual authentication is based on the exchanged secret information.

6. The method of claim 1, wherein the SSID that is unique to the requesting user device is specific to a current session.

7. The method of claim 1, wherein another unique SSID is dynamically generated for the requesting user device in a subsequent session.

8. The method of claim 1, wherein the verification of the de-authentication request comprises receiving a challenge at the requesting user device and a challenge response is sent from the requesting user device before the requesting user device is de-authenticated.

9. The method of claim 8, wherein the challenge is based on secret information that is shared between the access point and the requesting user device.

10. A method for dynamically generating service set identifiers, the method comprising:
    sending a beacon from an access point via a wireless transmission, the wireless beacon transmission sent via a wireless network interface at the access point, wherein the wireless beacon transmission does not include a service set identifier (SSID);
    receiving a request from a computing device to associate the computing device with the access point;
    sending a response to the request to the computing device, wherein the response does not include the SSID;
    receiving an authentication request sent from the computing device, wherein the authentication request includes pre-shared secret information;
    authenticating the computing device based at least in part on the pre-shared secret information included in the authentication request, wherein the association associating the computing device with the access point is established after the computing device is authenticate;
    sending a response to the authentication request;
    receiving an association request to associate the computing device with the access point, the association request including the SSID; and
    sending an authentication response to the computing device, wherein a communication session between the computing system and the access point is established based on the authentication of the computing device.

11. The method of claim 10, further comprising verifying the SSID in the association request before sending the authentication response to the computing device.

12. The method of claim 10, further comprising performing a communication handshake with the computing device in a negotiation associated with the authentication of the computing device, the communication handshake associated with a first key and a second key.

13. The method of claim 10, wherein the SSID is generated at the computing device.

14. The method of claim 13, wherein the SSID is also generated at the access point.

15. The method of claim 10, wherein the authentication request includes a certificate and the method further comprises verifying the certificate.

16. The method of claim 10, wherein the authentication request also includes a public key signed by a trusted authority.

17. The method of claim 16, further comprising sending an authentication response to the computing device that includes a pre-installed certificate and a public key associated with the access point that is signed by the trusted authority.

18. The method of claim 10, wherein the authentication response includes the SSID in an encrypted form.

19. The method of claim 10, wherein the authentication response includes a pre-installed certificate.

20. An apparatus for dynamically generating service set identifiers, the apparatus comprising:
    an antenna that:
      receives one or more beacons from an access point, wherein the one or more beacons do not include any service set identifiers (SSIDs),
      transmits a request via a wireless network interface, the request concerning association with a requesting user device and the access point, wherein the access point generates an SSID that is unique to the requesting user device and another user device uses a different SSID to associate with the access point, the different SSID being unique to the other user device
    a memory; and
    a processor of the requesting user device that executes instructions out of the memory to prepare a subsequent association request to send to the access point, wherein:

the subsequent association request concerning association with the access point as identified by the generated unique SSID, the access point is associated with the requesting user device based on a verification that the subsequent association request from the requesting user device includes the generated unique SSID that is unique to the requesting user device, a de-authentication request relating to terminating the association between the user device and the access point is sent to the access point via the antenna, and the association between the user device and the access point is maintained until the de-authentication request is verified.

21. The apparatus of claim 20, wherein the SSID generated is based on at least one of a MAC address of the requesting user device, random bits, a pre-shared secret, and vendor-specific information.

22. The apparatus of claim 21, wherein the SSID is generated by performing a hash function on the at least one basis of the SSID.

23. The apparatus of claim 21, wherein the SSID that is unique to the requesting user device is specific to a current session.

24. The apparatus of claim 20, wherein the requesting user device is authenticated by the access point prior to receipt of the unique SSID and the requesting user device mutually authenticates the access point.

25. The apparatus of claim 24, wherein secret information is exchanged between the access point and the requesting user device and the mutual authentication is based on the exchanged secret information.

26. The apparatus of claim 20, wherein another unique SSID is generated for the requesting user device in a subsequent session.

27. The apparatus of claim 20, wherein the verification of the de-authentication request comprises sending a challenge to the requesting user device and verifying a challenge response from the requesting user device prior to de-authenticating the requesting user device.

28. The apparatus of claim 27, wherein the challenge is based on secret information that is shared between the access point and the requesting user device.

29. A non-transitory computer-readable storage medium, having embodied thereon a program executable by a processor to perform a method for dynamically generating service set identifiers, the method comprising:

receiving one or more beacons from an access point, wherein the one or more beacons do not include any service set identifiers (SSIDs);

transmitting a request from a user device via a wireless network interface, the request concerning association with the access point, wherein a processor at the access point executes instructions stored in a memory at the access point to generate an SSID that is unique to the requesting user device and another user device uses a different SSID to associate with the access point, the different SSID being unique to the other user device;

sending a subsequent association request from the requesting user device, the subsequent association request concerning association with the access point as identified by the SSID that is unique to the requesting user device, wherein the access point is associated with the requesting user device based on a verification that the subsequent association request from the requesting user device includes the SSID that is unique to the requesting user device; and sending a de-authentication request relating to terminating the association between the user device and the access point, wherein the association between the user device and the access point is maintained until the de-authentication request is verified.

30. The non-transitory computer readable storage medium of claim 29, wherein the SSID generated for the requesting user device is based on at least one of a MAC address of the requesting user device, random bits, a pre-shared secret, and vendor-specific information.

* * * * *